INVENTORS
John R. Middents.
Richard M. Caccese

BY W. J. Eccleston
ATTORNEY

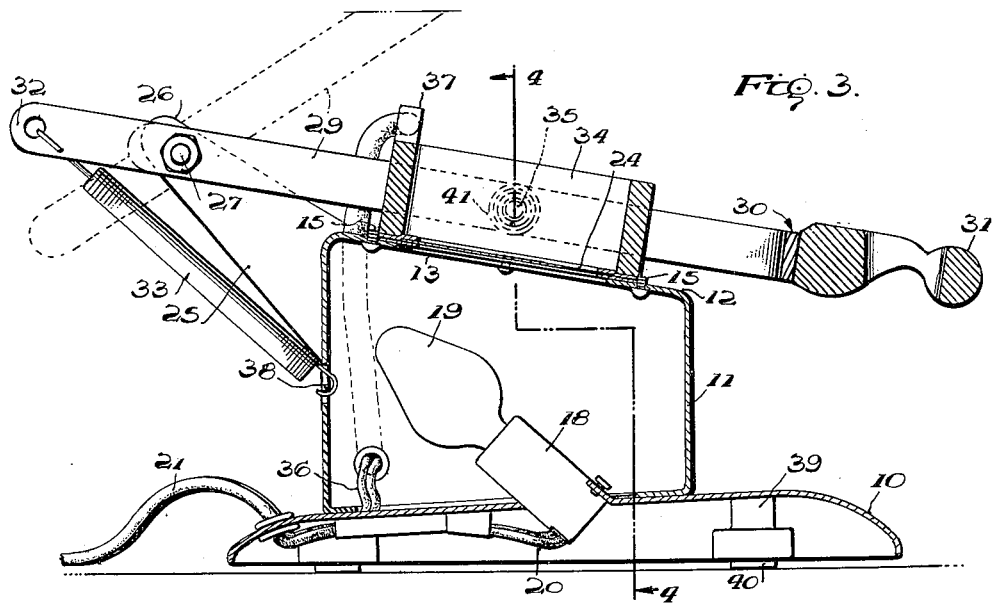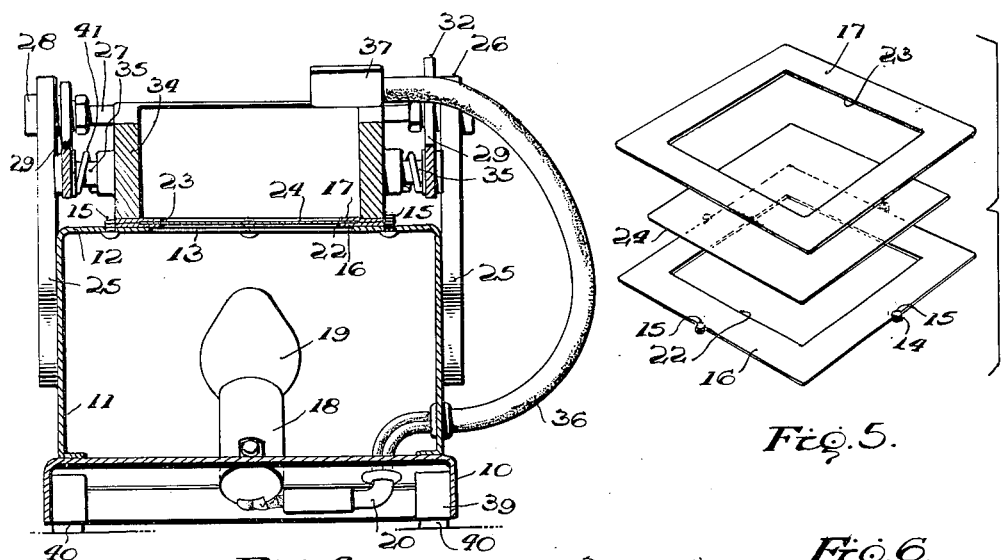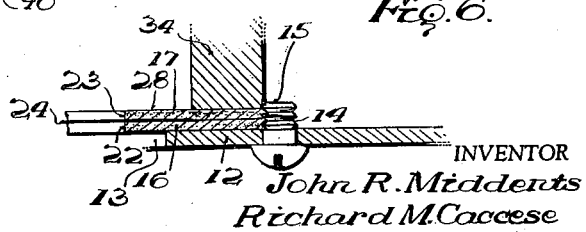

United States Patent Office 3,005,483
Patented Oct. 24, 1961

3,005,483
TRANSPARENCY MOUNTING MEANS
John R. Middents, 568 Madison St., St. Charles, Mo., and Richard M. Caccese, 103 W. Diamond Ave., Hazleton, Pa.
Filed Jan. 22, 1960, Ser. No. 4,582
5 Claims. (Cl. 156—583)
(Granted under Title 35, U.S. Code (1952), sec. 266)

The invention described herein, if patented, may be manufactured and used by or for the Government for governmental purposes, without the payment to us of any royalty thereon.

The invention relates to means for mounting photographic transparencies between separate frame members to provide a mounted transparency capable of being handled by slide projectors. In the past this work was normally done by the processor of the film who used automatic equipment to achieve the necessary speed and accuracy. In recent years, numerous "do it yourself kits" have come on the market whereby the amateur photograph may process his own color film. Obviously, it is impractical for such an amateur to use the costly automatic machinery for mounting the transparencies which are used by the professional processors.

The amateur is faced with a basic problem of holding the sandwich comprised of the bottom frame member, the transparency and the top frame member in alignment while the two frame members are heat sealed together. Another factor is that the transparency frequently slips out of registry slightly and such slip is unnoticed until after the heat sealing operation.

With the foregoing in view, it is an object of the invention to provide improved means for mounting transparencies.

A further object is to provide improved means for maintaining the several parts of the transparency mount in alignment until after the heat sealing operation.

A further object is to provide in such a mounting means, means for illuminating the transparency throughout the operation to insure that any deviation from registry will be noticed as soon as it occurs.

Other objects and advantages reside in the particular structure of the device, the structure of the several elements thereof, combinations and subcombinations of such elements with each other and/or with the material operated upon, all of which will be readily apparent to those skilled in the art upon reference to the drawing illustrating an embodiment of the invention and to the specification wherein the invention is described and claimed.

In the drawing:

FIGURE 3 is a longitudinal vertical sectional view taken substantially on the plane of the line 3—3 of FIGURE 2;

FIGURE 4 is a transverse vertical sectional view taken substantially on the planes of the line 4—4 of FIGURE 3;

FIGURE 5 is an exploded perspective view of the sandwich, portions of the mounting being fragmentarily illustrated; and FIGURE 6 is an enlarged fragmentary sectional view showing a detail.

Figure 1:
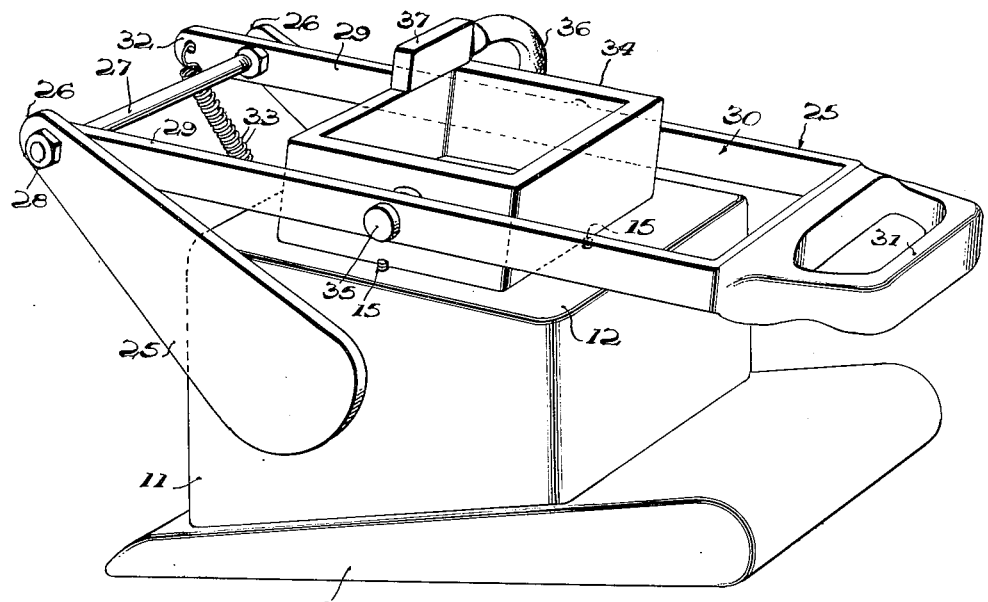
FIGURE 1 is a perspective view of a transparency mounting means according to the invention.
Figure 2:
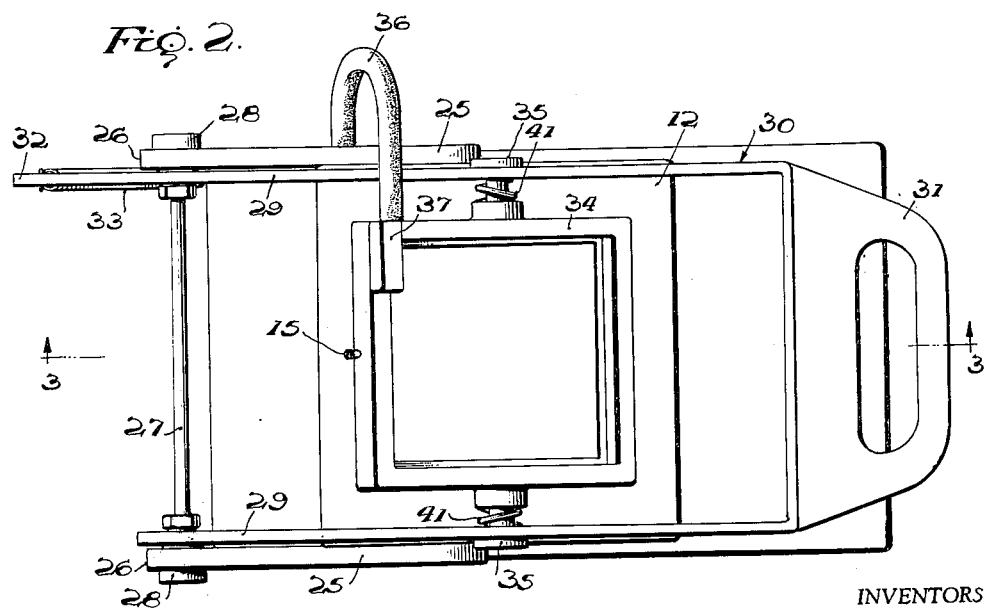
FIGURE 2 is a top plan view thereof.

Referring specifically to the drawing, wherein like reference characters designate like parts in all views, 10 designates a suitable base for the device which mounts a suitable housing 11 thereon which preferably includes a forwardly and downwardly inclined top wall 12. The top wall 12 is provided with a rectangular opening 13 therein which is shaped to correspond to the opening in the transparency mount but which is preferably slightly larger than such opening. The top wall 12 is provided with a plurality of upstanding guide members 15. In the embodiment illustrated, four guide members 15 are provided, with one being centrally disposed along each side of the opening 13. The guide members 15 are in the nature of inverted machine screws which they may actually be. They are secured to the top wall 12 in any suitable manner as by press fits in holes, by being threaded through threaded holes, by being welded thereto or otherwise. In any event, at least the sides of the guides 15 which face the opening 13 are provided with serrations or the like 14 (FIGURE 6) for a purpose to be apparent hereinafter. The guide members are spaced apart distances corresponding to the two lateral dimensions of the frame members adapted to be seated therebetween. Such frame members 16 and 17 are best seen in FIGURE 5 are square. However, it is to be understood that the invention is equally applicable to oblong frame members in which event the locations of the guide members 15 are changed appropriately.

As shown in FIGURES 3 and 4, the housing 11 is hollow and has mounted therein a socket 18 for a small electric light bulb 19 which socket 18 is connected to a suitable source of electric current by means of a suitable electric lead wires 20 which in turn are connected to a power line 21. Light 19 is located to shine upwardly through the opening 13 and the corresponding openings 22 and 23 in the mounting members 16 and 17 respectively. Thus with the transparency 24 sandwiched between the mounting members 16 and 17 the transparency is illuminated and can be adjusted very accurately. Also, any future misalignment of the transparency will be instantly revealed.

A pair of arms 25 are secured to opposite sides of the housing 11 in any suitable manner as by being welded thereto. Arms 25 extend upwardly and rearwardly of the housing and terminate in free ends 26 which are connected together by a shaft 27 which is secured to the arms in any suitable manner as by the nuts 28. Shaft 27 pivotally mounts the rear portions of the legs 29 of a yoke member 30. Legs 29 extend forwardly over the top wall 12 of the housing and terminate forwardly in a cross head means which is preferably formed to provide a hand grip 31. The free rear end 32 of one of the legs 29 extends rearwardly beyond the shaft 27 and is operatively connected to a coil spring 33 which in turn is connected by any suitable means to the housing 11, as by being hooked over a lug 38 which spans a hole in a wall of housing 11, FIGURE 3. The arrangement is such that the spring 33 normally maintains the yoke 30 in an elevated position as suggested in broken lines in FIGURE 3. A gimbal 34 is carried by the legs 29 intermediate the length thereof and is pivoted thereto by the trunnions 35. Gimbal 34 is in the form of a rectangular frame having outside dimensions slightly smaller than the like dimensions of the mounting frame members 16 and 17. This permits a slight clearance between the gimbal 34 and the serrations 14 of the guides 15. The inside dimensions of the gimbal 34 are slightly larger than the dimensions of the transparency 24 whereby to encircle the latter. Gimbal 34 is formed as an electric heater and is connected to the power line 21 by suitable leads 36 and connection 37. Gimbal springs 41 encircle trunnions 35 and have opposite ends connected respectively to the gimbal 34 and legs 29. Springs 41 are arranged to resiliently hold the gimbal in substantially parallel relation to the legs 29.

In operation, the lower frame member 16 is positioned atop the housing top wall 12. The serrations 14 of guides 15 resist but do not prevent the entrance of the frame member 16 and frictionally resist the withdrawal of the frame. The transparency 24 is now applied to the lower frame member 16 and centered thereon. The top frame member 17 is now pressed down on top of the transparency and the lower frame member 16. At this time the operator carefully checks by means of the light 19 to insure that the transparency 24 is properly centered between the frame members 16 and 17. It is understood, of course, that the facing surfaces of the frame members 16 and 17 are coated with any suitable heat sealable adhesive, not shown. Meanwhile, it is understood that the power line 21 has been previously activated whereby the light 19 is lit and the gimbal 34 has been heated to an operating temperature. The hand grip 31 is now grasped and the same is pulled downwardly until the gimbal 34 rests on the top frame member 17. Sufficient downward pressure is applied manually for a period long enough to activate the heat sealable adhesives and seal the two frame members 16 and 17 together. All this occurs while the transparency 24 is in full view of the operator because of the open nature of the gimbal and the action can be viewed up to the last second if the transparency becomes mis-aligned. However, the transparency is clampingly gripped between the frame members 16 and 17 because serrations 14 of guides 15 prevent separating movement of such frame members. Thus, mis-alignment of the transparency is unlikely.

The yoke 30 is now elevated and the mounted transparency removed by the operator manually lifting it upwardly from one or more corners out of the grip of the guides 15.

The top wall 12 is forwardly and downwardly inclined to allow the operator a good view of the transparency without craning his neck. Any suitable switch means, not shown, may be provided in the line 21 to turn the heater and light off and on. A conventional footswitch is particularly useful in this connection. The base 10 may be hollow to accommodate the leads 20 and is supported by suitable feet 39 which are preferably provided with rubber or like pads 40, FIGURES 3 and 4.

While there has been shown and described what is now considered to be a preferred embodiment of the invention it should be understood that the same is susceptible of other forms and expressions. Consequently, we do not consider that the invention is limited to the precise structure described and shown hereinabove but only as hereinafter claimed.

We claim:

1. In a means for heat sealing together upper and lower mounting frames for a photographic transparency with said transparency sandwiched between said frames, said frames having four sides; the improvement comprising a support for said frames and transparency, guide means comprising at least four rigid uprights fixed to said support in equispatial relation and each adapted to engage a different side of said frames centrally thereof to prevent lateral movement of the same on said support, said uprights having inner frame engaging surfaces adapted to engage said frames and each being formed with a series of vertically spaced serrations providing holding means adapted to resist the withdrawal of said frames from said guides in an upwardly direction, said serrations of each series being spaced apart distances less than the thickness of each of said frames, and means for heat sealing said frames together while said frames are held by said serrations.

2. In a means for heat sealing together upper and lower mounting frames for a photographic transparency with said transparency sandwiched between said frames; the improvement comprising a support for said frames and transparency, guide means comprising at least four rigid uprights fixed to said support in equispatial relation and adapted to engage said frames therebetween to prevent lateral movement of the same on said support, said uprights having inner frame engaging surfaces adapted to engage said frames and being formed with holding means adapted to resist the withdrawal of said frames from said guides in an upwardly direction, said holding means comprising a vertical series of serrations formed on said inner surfaces of said guides, said serrations of each series being spaced apart distances less than the thickness of each of said frames, and means for heat sealing said frames together while said frames are held by said guide means.

3. In a means for heat sealing together an assembly comprising upper and lower mounting frames for a photographic transparency with said transparency sandwiched between said frames, said means including a base for supporting said assembly; the improvement comprising guide means on said base for engaging and positioning said assembly thereon, said guide means comprising at least two spaced and opposed uprights fixed to said base, said uprights having inner surfaces adapted to receive said frames therebetween, said surfaces including a plurality of horizontal serrations, said serrations of each surface being spaced apart distances less than the thickness of each of said frames, said serrations frictionally engaging said frames and resisting withdrawal of the same in an upward direction, and means for heat sealing said frames together while held by said serrations.

4. In a means for heat sealing together an assembly comprising upper and lower mounting frames having a photographic transparency sandwiched therebetween, said means including a base for supporting said assembly; the improvement comprising at least four uprights fixed to said base in equi-spacial relation to provide an enclosure receiving said assembly therein with a close fit, said uprights having inner surfaces formed with vertical series of fine horizontal serrations, said serrations of each series being spaced apart distances less than the thickness of each of said frames, said serrations of each series having frictional engagements with said frames when the same are pressed downwardly thereof onto said base, said serrations comprising means thereafter maintaining said frames lightly compressed together to secure said transparency against movement relative to said frames, and heat sealing means operative to press said frames firmly together throughout the heat sealing operation.

5. An apparatus according to claim 4, wherein said uprights comprise cylindrical posts having peripheries formed with fine screw threads to provide said serrations.

References Cited in the file of this patent
UNITED STATES PATENTS

| | | |
|---|---|---|
| 2,524,178 | Rochwite | Oct. 3, 1950 |
| 2,596,253 | Kurkjian | May 13, 1952 |
| 2,620,014 | Lyijynen | Dec. 2, 1952 |
| 2,745,463 | Rempel | May 15, 1956 |